United States Patent
Fralic

(10) Patent No.: US 7,882,009 B2
(45) Date of Patent: Feb. 1, 2011

(54) METHOD OF ON-LINE AUCTIONING FOR LEASES

(76) Inventor: Donald R. Fralic, 100 Oxford Dr., Suite 710, Monroeville, PA (US) 15146

( * ) Notice: Subject to any disclaimer, the term of this patent is extended or adjusted under 35 U.S.C. 154(b) by 2343 days.

(21) Appl. No.: 10/047,366

(22) Filed: Jan. 14, 2002

(65) Prior Publication Data
US 2004/0039678 A1 Feb. 26, 2004

Related U.S. Application Data

(60) Provisional application No. 60/262,148, filed on Jan. 16, 2001.

(51) Int. Cl.
*G06F 17/60* (2006.01)
(52) U.S. Cl. .......................... 705/37; 705/35
(58) Field of Classification Search .................... 705/37
See application file for complete search history.

(56) References Cited

U.S. PATENT DOCUMENTS

| | | | | |
|---|---|---|---|---|
| 5,797,133 A | * | 8/1998 | Jones et al. ................... 705/38 |
| 5,924,082 A | * | 7/1999 | Silverman et al. ............. 705/37 |
| 5,930,776 A | * | 7/1999 | Dykstra et al. ................ 705/38 |
| 5,940,812 A | * | 8/1999 | Tengel et al. .................. 705/38 |
| 5,966,699 A | * | 10/1999 | Zandi .......................... 705/38 |
| 5,995,947 A | * | 11/1999 | Fraser et al. .................. 705/38 |
| 6,049,784 A | * | 4/2000 | Weatherly et al. ............. 705/38 |
| 6,233,565 B1 | * | 5/2001 | Lewis et al. ................... 705/35 |
| 6,237,009 B1 | * | 5/2001 | Waldo et al. ................. 707/206 |

* cited by examiner

*Primary Examiner*—Thomas Dixon
*Assistant Examiner*—Gerald C Vizvary
(74) *Attorney, Agent, or Firm*—The Webb Law Firm

(57) ABSTRACT

The present invention is a reverse auction/lease and review/evaluation method to be used on the Internet. The method permits quantitative analysis of competitive leasing offers according to financial fundamentals and lessee defined qualitative variables and their relative weighting. The invention includes multiple Internet displayable screens which depict and permit inclusion of quantitative and qualitative variables as defined by the lessee. The invention also includes a scoring system by which the lessee can objectively and quantitatively measure competitive bids of prospective lessors participating in a reverse auction conducted on the Internet.

4 Claims, 14 Drawing Sheets

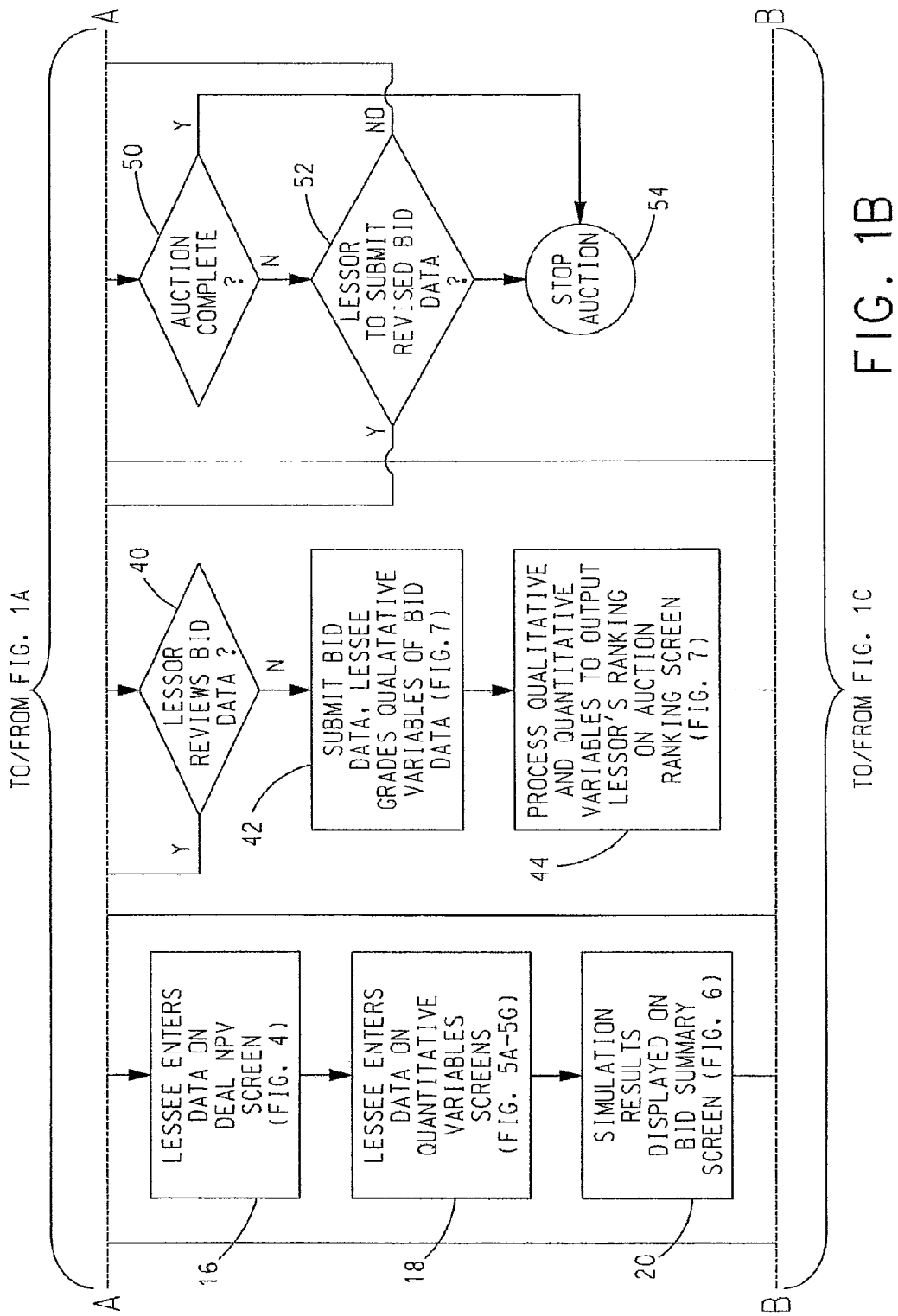

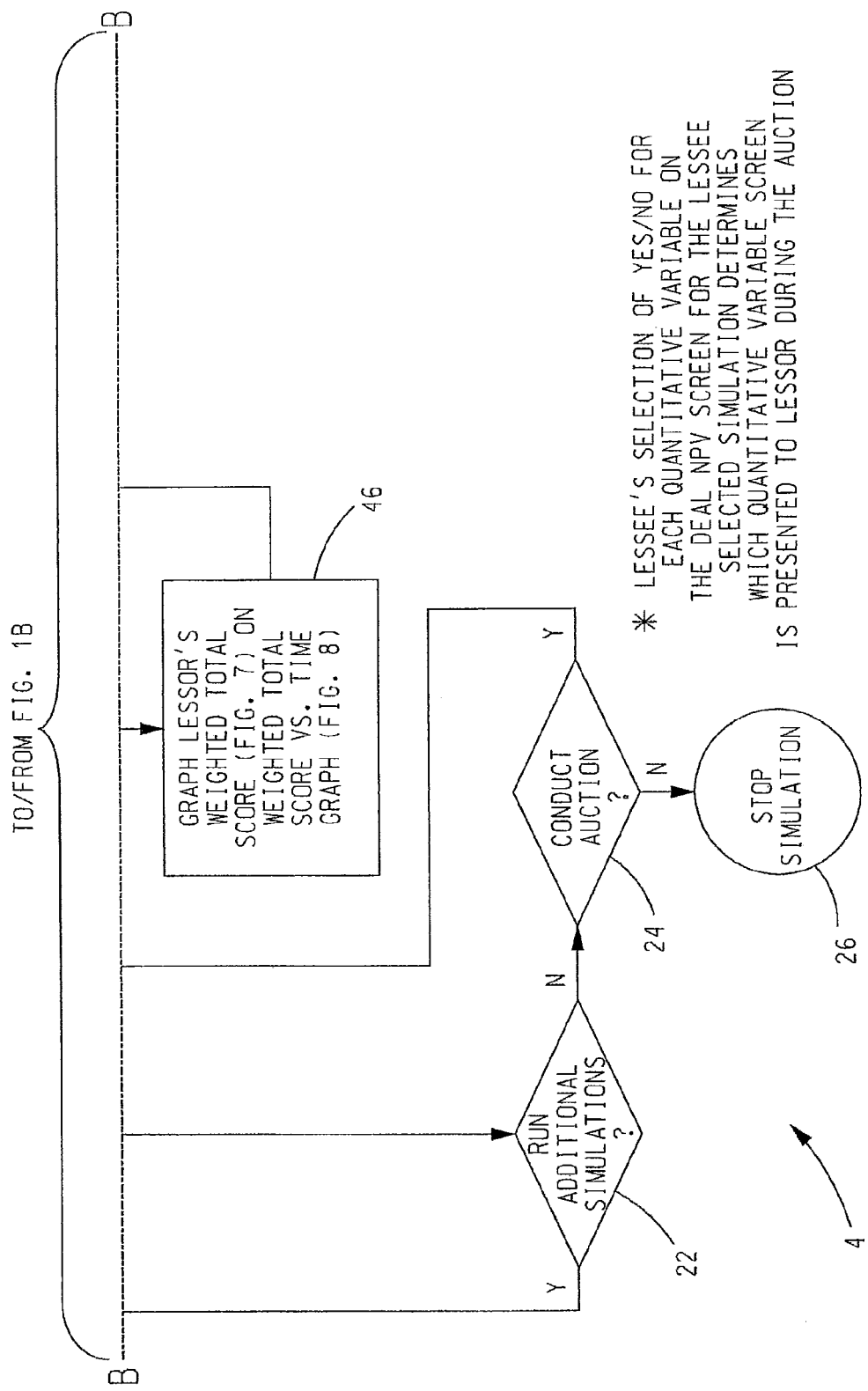

QUALITATIVE LESSOR VARIABLES

| QUALITATIVE VARIABLES DISCRIPTION | GRADE | RELATIVE WEIGHT TOTAL=100% | * WEIGHTED SCORE |
|---|---|---|---|
| 1 ACCEPTABLE LOAN DOCUMENTS | A | 60% | 2.4 |
| 2 PRIOR EXPERIENCE WITH LESSOR | B | 20% | .6 |
| 3 LESSOR REPUTATION | B | 15% | .45 |
| 4 KNOWLEDGE OF EQUIPMENT | F | 0% | |
| 5 PUBLIC COMPANY | F | 0% | |
| 6 VENDOR/LESSOR | D | 5% | .5 |
| 7 " | | % | |
| 8 " | | % | |
| 9 " | | % | |
| 10 LESSEE DEFINED VARIABLES: | | | |
| 1 | | % | |
| 2 | | % | |
| 3 | | % | |
| 4 | | % | |
| 5 | | % | |
| TOTAL | | 100% | 3.95 |

MISCELLANEOUS ADDITIONAL PAYMENTS

222 {
PERSONAL PROPERTY TAXES:
MONTHLY BY LESSOR (NEGATIVE) $ — 225
NPV $ — 226
MONTHLY BY LESSEE (POSITIVE) $ — 227
NPV $ — 228
}

224 {
MAINTENANCE:
MONTHLY BY LESSOR (NEGATIVE) $ — 229
NPV $ — 230
MONTHLY BY LESSEE (POSITIVE) $ — 231
NPV $ — 232
}

FIG. 5F

METHOD OF ON-LINE AUCTIONING FOR LEASES

CROSS REFERENCE TO RELATED APPLICATION

This application claims priority from U.S. Provisional Patent Application Ser. No. 60/262,148, filed Jan. 16, 2001.

BACKGROUND OF THE INVENTION

1. Field of the Invention

The present invention relates to method of lease auctioning.

2. Description of the Prior Art

On-line auctioning, particularly reverse auctions, for the sale or lease of products has become commonplace. Auction web sites often provide prospective lessees the ability to post request for quotes (RFQs) on their web page for prospective lessors to review before or during an auction.

Much of the lease process is highly quantitative. However, often, qualitative information, known only to the lessee, affects the lessee's decision to enter into a lease with a particular lessor. This qualitative information can include the loan documents, i.e., the terms and conditions of the lease, the prior experience of the lessee with the prospective lessor, the reputation of the lessor, the lessor's knowledge of the product being leased, whether the lessor is a public or private company, whether the lessor is also a vendor of the leased product and so forth.

Presently, on-line lease auctioning methods do not provide for the lessee to communicate such qualitative information to a prospective lessor before or during an auction and do not provide a prospective lessor with any feedback on this qualitative information during an auction.

It is, therefore, an object of the present invention to overcome the above problem and others by providing a computer-based on-line auctioning method for enabling a lessee to communicate to prospective lessors, before and/or during an auction, qualitative information that enables each prospective lessor to determine the effect of such qualitative information on the lessee's decision to accept a bidIt is another object of the invention to provide an on-line method for enabling a lessee to run one or more simulation leases that include estimated quantitative data and qualitative data prior to conducting an auction and then utilize this data in the RFQ supplied to prospective lessors before or during the auction. Still other objects of the present invention will become apparent to those of ordinary skill in the art upon reading and understanding the following detailed description.

SUMMARY OF THE INVENTION

The present invention is an on-line Internet based method for enabling a lessee to simulate one or more prospective leases based on quantitative lease data and qualitative lease data. Based on the quantitative data and the qualitative data, a weighted total score for each lease simulation is determined. If the lessee runs two or more lease simulations, these lease simulations can be presented on a display terminal of the lessee individually or in a side-by-side manner to enable the lessee to quickly and accurately ascertain a preferred lease simulation that best fits the lessee's lease requirements. The lessee can then select this preferred lease simulation and cause the selected simulation and, more particularly, the quantitative or qualitative data from the selected simulation to be available on-line to prospective lessors, preferably, in the form of a request for quote (RFQ).

The present invention is also related to an on-line method for conducting a reverse auction where prospective lessors can log onto a web site hosting the auction and retrieve therefrom the lessee's RFQ which includes the quantitative and qualitative data of the lessee's preferred selected simulation. Importantly, the qualitative data can include data entered into the data screens discussed hereinafter and can also include lessee's preferred lease terms and conditions. By being able to consider the lessee's qualitative data, the lessor can better access the importance of this qualitative data to the lessee and adjust his bid accordingly. After receiving the RFQ, the lessor can continue the auction or exit from the auctionIf the lessor continues, he is presented with data screens similar to those data screens presented to the lessee during the preferred lease simulation for entering appropriate data in corresponding data fields. Once the lessor completes entering data on the various data screens, the entered data is processed and a scoring summary screen is prepared and displayed for the lessor to evaluate his bid. If the lessor is satisfied with the bid, he can cause the bid data to be submitted to the lessee on-line. Prior to receipt by the lessee, the bid data is processed. The processed bid data is output to the lessee and the lessor on-line as a score in an auction ranking screen which also includes scores from other lessors participating in the auction. In addition, a graph of weighted total score vs. time is output to each prospective lessor and the lessee to enable evaluation of the status of the lease bidding and, more particularly, to enable each prospective lessor to know where his bid ranks with respect to bids received from other prospective lessors.

If, during the auction, a prospective lessor wishes to submit a revised bid, he can enter revised data on a new set of data screens or can retrieve one or more of the prior data screens and revise selected data therein. Thereafter, the prospective lessor can submit the revised bid for processing and output on the auction ranking screen and on the graph of weighted total score vs. time.

When the auction is complete, further bid submissions are terminated and the lessee can then accept one of the bids or reject all of the bids and initiate another auction at a later date.

BRIEF DESCRIPTION OF THE DRAWINGS

FIG. 3 is a schematic drawing of an on-line qualitative lessor's variables screen for receiving data regarding qualitative factors considered by a lessee to be important in a decision to enter into a lease with a prospective lessor;

FIGS. 5A-5G are schematic drawings of on-line quantitative variable screens for receiving, during a lease simulation and/or auction, lessee entered data and lessor entered data, respectively, including a lease payments screen, a cash performance deposit screen, an end of term options screen, a lessor equity requirement screen, a mid-term interest rate decrease screen, a miscellaneous additional payments screen, and a lessee defined variables screen;

DETAILED DESCRIPTION OF THE PREFERRED EMBODIMENT

Having described the invention generally, the invention will now be described in greater detail with reference to the accompanying Figures.

Figure 1A:
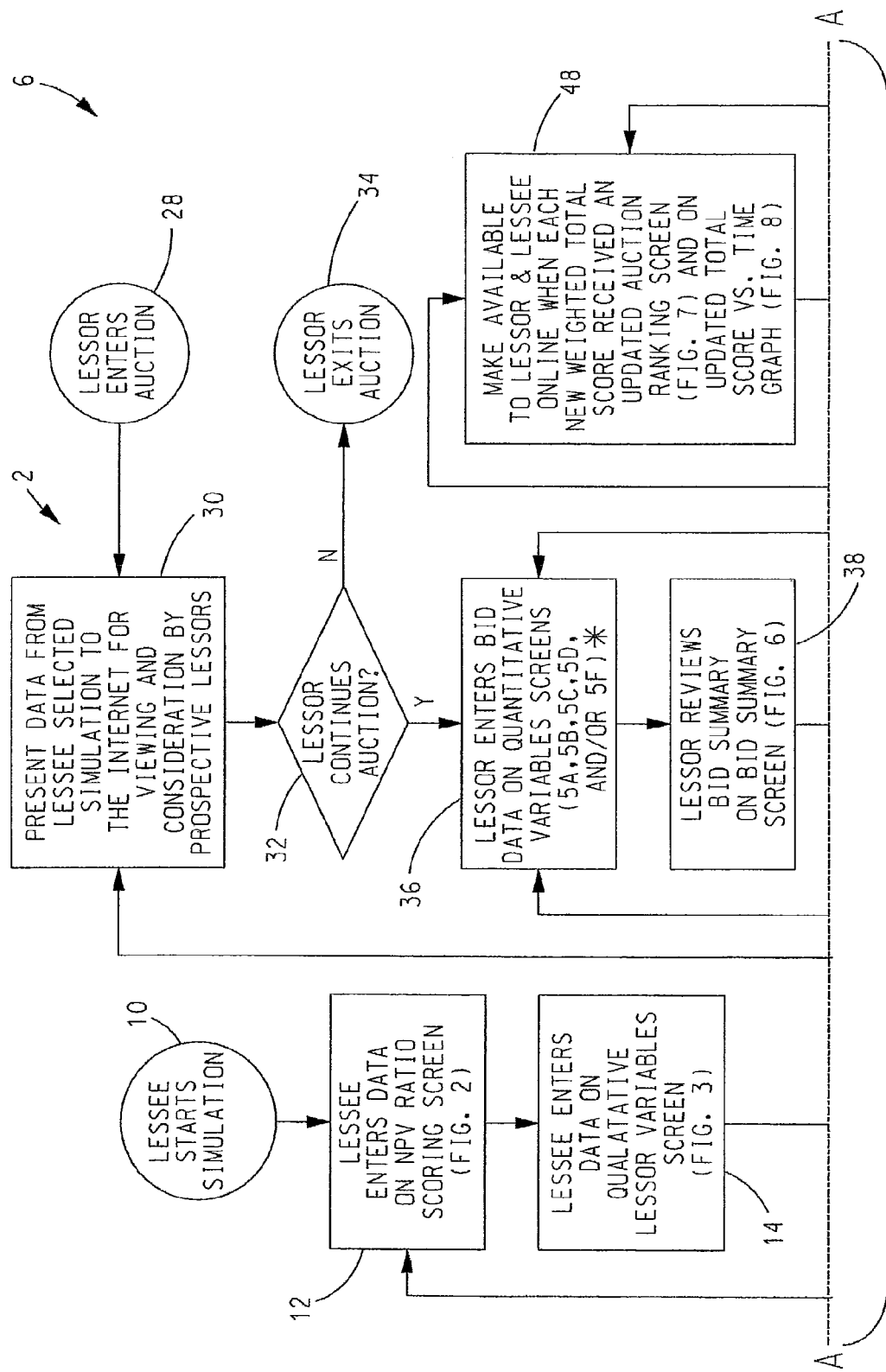
FIG. 1 is a flow chart of a method of on-line lease simulation and lease auctioning in accordance with the present invention.

With reference to FIG. 1, a flow chart 2 of a method in accordance with the present invention includes a lessee simulation part 4 and an auction part 6. Flow chart 2 essentially describes the operation of computer software that is resident on an Internet web site hosting computer which is connected to and forms part of the worldwide web, also commonly referred to as the "Internet". This computer can be operated by a third party Internet service provider, which also hosts other web sites, or can be operated by a lessee who runs lease simulations and conducts auctions in a manner to be described hereinafter.

Figure 2:
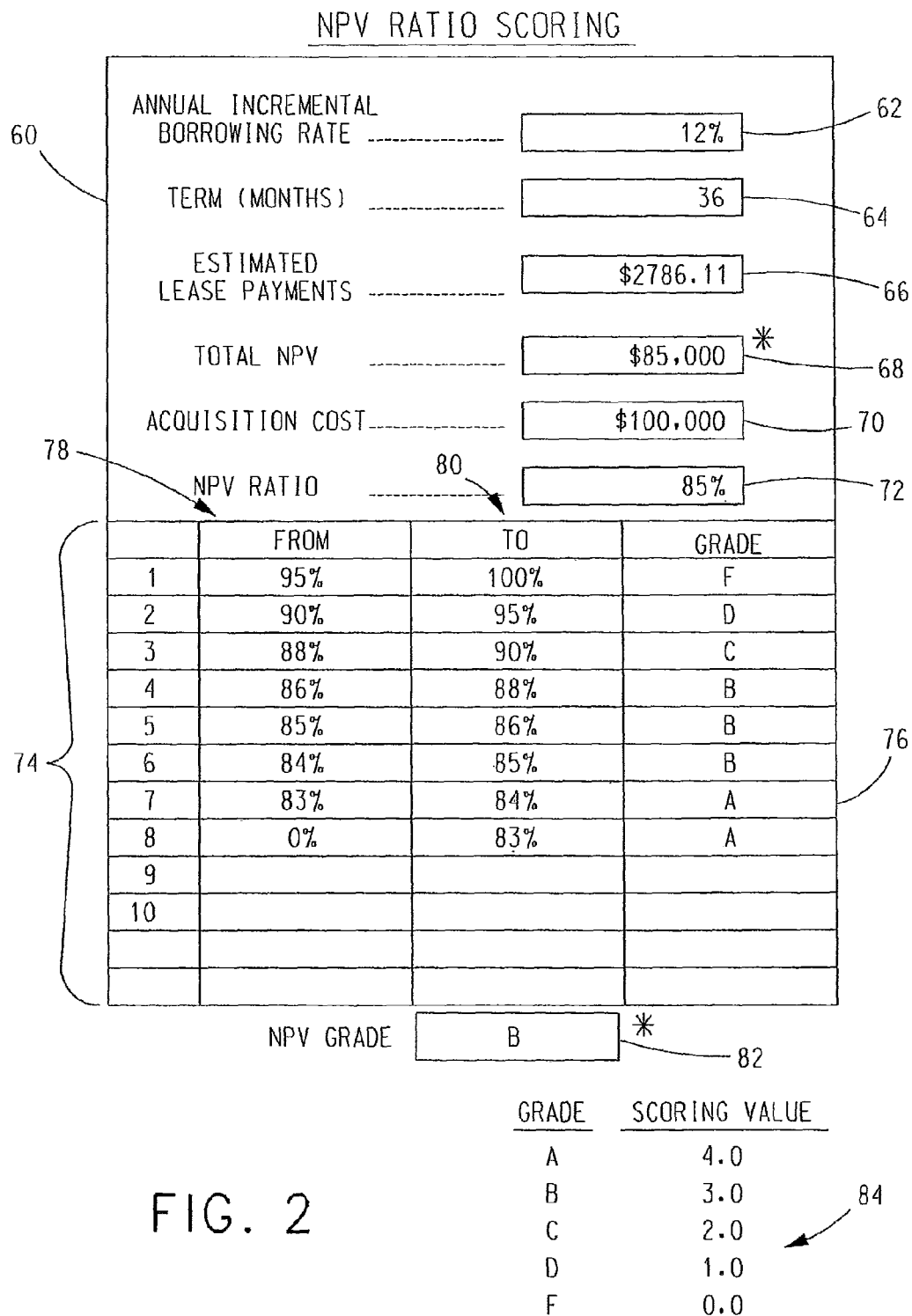
FIG. 2 is a schematic drawing of an on-line net present value (NPV) ratio scoring screen for receiving lessee data related to a lease simulation.

The lease simulation part 4 of flow chart 2 includes a step 10 where the lessee commences a simulation. Upon commencing the simulation, the software advances to step 12 where a net present value (NPV) ratio scoring screen 60, shown in FIG. 2, is displayed on a computer terminal of the lessee. NPV ratio scoring screen 60 includes a field 62 for receiving an annual incremental borrowing rate for the simulation. A field 64 is provided for receiving the term of the lease. Preferably, field 64 is configured to receive the lease term in months. A field 66 is provided for receiving the estimated lease payments and a field 68 is provided for displaying the software calculated total NPV of the lease payments received in field 66 discounted at the borrowing rate received in field 62. A field 70 is provided for receiving the acquisition costs and a field 72 is provided for displaying an NPV ratio which the software calculates as a ratio of a total NPV inserted in field 68 divided by the acquisition costs received in field 70. Preferably, the NPV ratio entered into field 72 is rounded to the nearest whole percentage.

NPV ratio scoring screen 60 includes a matrix 74 configured to receive a lessee assigned "Grade" for each range of percentages of NPV ratios. For example, matrix 74 includes a row 76 where the lessee can enter an NPV grade, e.g., B, for a desired range of percentages, e.g., 84%-85%. In matrix 74, the lower percentage received in a "From" column 78 of each row is inclusive while the greater percentage received in a "To" column 80 is exclusive. Thus, for example, in row 76, the percentage received in "From" column 78 includes the listed percentage, i.e., 84%, while the NPV grade received in "To" column 80 does not include the listed percentage, i.e., 85%. As shown in matrix 74, an NPV grade can be utilized more than once for different ranges of NPV ratios. Lastly, NPV ratio scoring screen 60 includes a field 82 for receiving from matrix 74 the grade corresponding to the NPV ratio received in NPV ratio field 72. Thus, when the software calculates the NPV ratio for field 72, the software also extracts from matrix 74 the grade corresponding to the NPV ratio received in field 72 and inserts this grade in field 82.

In the Figures, fields that the software inserts values or data therein based on values or data entered into other fields are indicated by an asterisk (*).

Shown at the bottom of FIG. 2 is a default scale 84 of scoring values for corresponding NPV grades. The scoring value assigned to each NPV grade can be preselected by the software, or one or more separate data screens (not shown) can be configured for receiving scoring values for each grade utilized in NPV ratio scoring screen 60 or subsequent screens, to be discussed hereinafter. In the present invention, letter grades A-F are preferred for simplicity. However, other symbols or numerical grades can also be utilized. Additional variable ratio scoring screens, similar to screen 60, may be set up by the lessee for reevaluation and inclusion of internal rate of return, trade-in amounts, soft costs, etc.

With reference back to FIG. 1, when the lessee completes entering data or values in the various fields of NPV ratio scoring screen 60, the software advances to step 14 where a qualitative lessor variables screen 90, shown in FIG. 3, is displayed on the lessee's display terminal. Qualitative lessor variables screen 90 includes a matrix 92 having a description column 94, a grade column 96, a relative weight column 98, and a weighted score column 100. Each row of description column 94 includes a predetermined or lessee entered description of a qualitative lessor variable that the lessee wishes to consider. Each qualitative variables description has in its associated row a grade field in column 96 for receiving a lessee selected grade, a relative weight field in column 98 for receiving a lessee selected percentage relative weight, and a score field for receiving a software calculated score in column 100. For example, in the row having a qualitative variables description "Acceptable Loan Documents", the lessee can enter a grade of "A" and a relative weight of 60% in the corresponding fields in columns 96 and 98. When the lessee enters data in columns 96 and 98, the software sums the relative weights received in each row of column 98 and inserts this sum in a relative weight total field 102. To calculate the score for each row, the software substitutes for each grade received in column 96 the corresponding scoring value shown in scale 84 of FIG. 2 and multiplies this scoring value by the corresponding relative weight in column 98 to obtain a corresponding score. For example, in row 106, the scoring value 4.0 is substituted for the grade "A" and this scoring value is multiplied by 60%, i.e., 0.60, to obtain a score of 2.4. Similar calculations are performed in respect of the calculation of the score for each row receiving a grade and a relative weight. If the sum of the relative weights inserted in field 102 does not equal 100%, the lessee is prompted to amend one or more of the relative weights so that their sum equals 100%. If, however, the sum of relative weights in column 98 totals 100%, the software calculates a score for each row of matrix 92 and enters each score in the corresponding score field in column 100.

Next, the software sums the scores in column 100 and inserts this sum in score total field 104.

With reference back to FIG. 1, when the lessee completes entering data or values into qualitative lessor variables screen 90, the software advances to step 16. In step 16, the software displays a deal NPV screen 110, shown in FIG. 4, on the lessee's display terminal. Deal NPV screen 110 includes a column 112 which includes a predetermined list of NPVs that the lessee can include in the simulation by selecting for each NPV a corresponding field in a "Yes" column 114 or in a "No" column 116.

Figure 4:
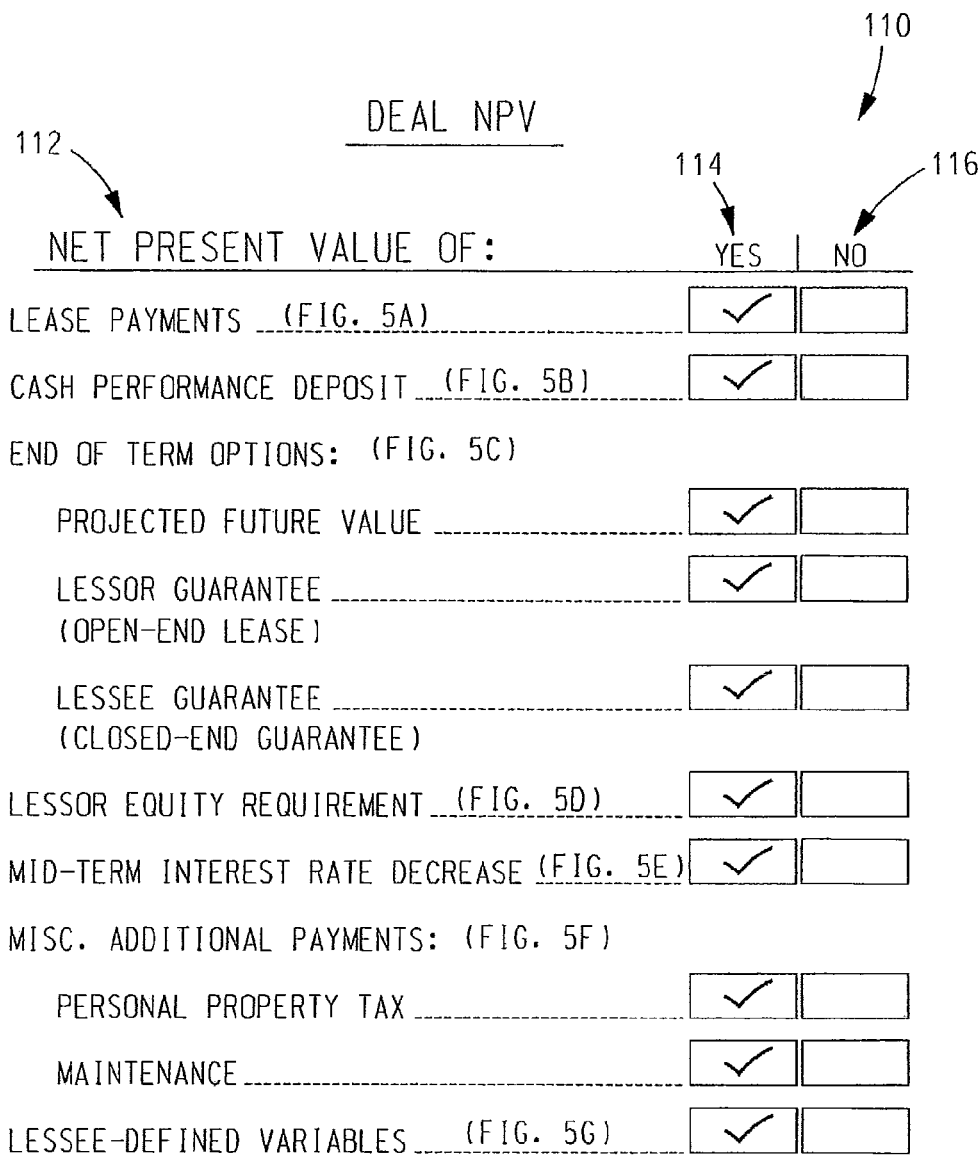
FIG. 4 is a schematic drawing of an on-line deal NPV screen which a lessee utilizes to select on-line quantitative variable screens and to indicate which quantitative variables are to be included in calculation of the total deal NPV.
Figure 5A:
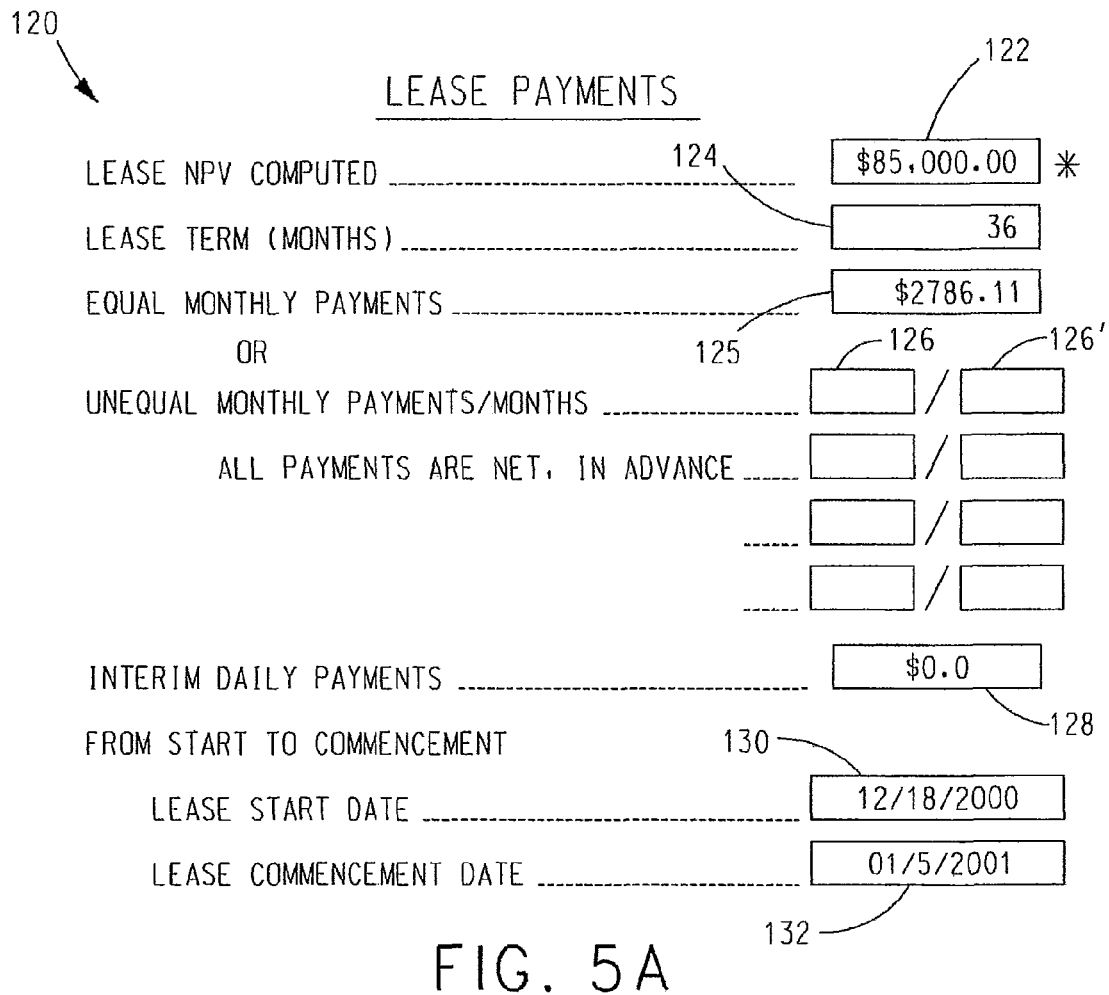

Once the lessee has selected a field in "Yes" column 114 or a field in "No" column 116 for each NPV listed in column 112, the software advances to step 18 and displays on the lessee's display terminal one or more the quantitative variable screens, shown in FIGS. 5A-5G, corresponding to the selected fields in "Yes" column 114. For purpose of illustration, each field in "Yes" column 114 is shown as being selected. This selection results in the software displaying on the lessee's display terminal the screens shown in FIGS. 5A-5G. If, however, one or more fields in "No" column 116 of FIG. 4 is selected, the corresponding screen, or part thereof, in FIGS. 5A-5G would not be displayed on the lessee's display terminal. For example, if the field in "Yes" column 114 for the NPV of lease payments is selected, the lease payments screen 120 shown in FIG. 5A is displayed on the lessee's display terminal. In contrast, if the field in "No" column 1 16 is selected for the NPV of lease payments, the lease payments screen 120 will not be displayed on the lessee's display terminal. For purpose of illustration, the Figure corresponding to the screen displayed in response to selection of a field in "Yes" column 114 is shown in FIG. 4.

In response to the lessee selecting the field in "Yes" column 114 associated with the NPV of lease payments of column 112, the software displays on the lessee's display terminal the lease payments screen 120 shown in FIG. 5A. Lease payment screen 120 includes a lease NPV computed field 122 for receiving a software calculated lease NPV value, a lease term field 124 for receiving a lessee entered lease term, an equal monthly payments field 125 for receiving a monthly payment value, a plurality of unequal monthly payments/months fields 126 and 126' for receiving monthly payments and number of months, respectively, an interim daily payments field 128 for receiving data regarding interim daily payments, a lease start date field 130 for receiving a projected start date, and a lease commencement date field 132 for receiving a lessee projected lease commencement date. The software is configured so that if data is entered into the equal monthly payments field 125, the software will not receive data in the unequal monthly payments/months fields 126, 126', and vice versa.

The value inserted by the software into lease NPV computed field 122 is calculated from data received in lease term field 124 along with data received in equal monthly payments field 125 or in two or more of the unequal monthly payments/months fields 126, 126'. The annual incremental borrowing rate utilized to calculate the value inserted in the lease NPV computed field 122 is acquired from field 62 of NPV ratio scoring screen 60 shown in FIG. 2. In addition, the value inserted in the lease NPV computed field 122 can also be calculated as a function of the interim daily payments received in field 128, providing data is entered therein. In practice, the "Yes" field in column 114 associated with lease payments is always selected.

Figure 5B:
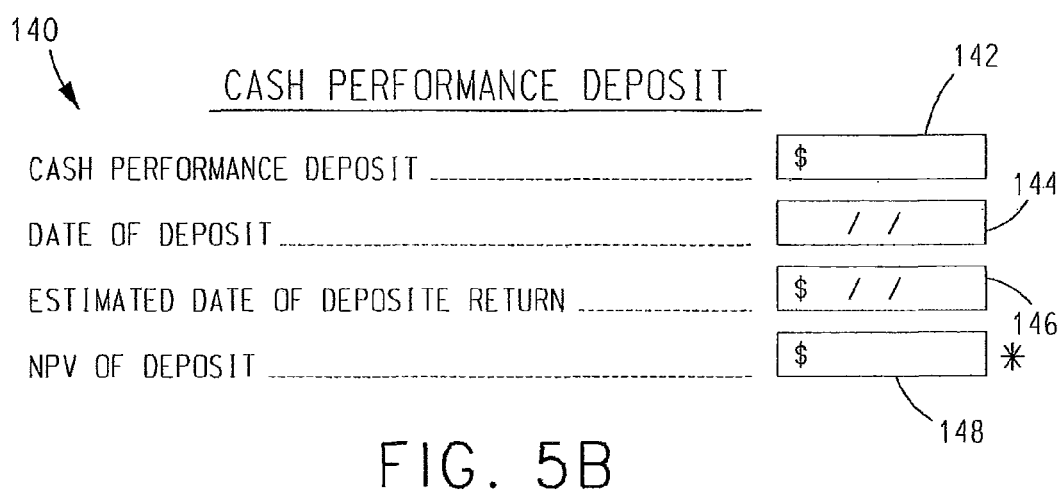

With reference back to FIG. 4, if the "Yes" field in column 114 associated with the cash performance deposit of column 112 is selected, the software displays on the lessee's display terminal the cash performance deposit screen 140 shown in FIG. 5B. Cash performance deposit screen 140 includes a field 142 for receiving data regarding a cash deposit to be made by the lessor to secure performance of the lease by the lessor. Cash performance deposit screen 140 also includes a field 144 for receiving a date of deposit, a field 146 for receiving the estimated date of return of deposit to lessor, and a field 148 for receiving a software calculated NPV of the deposit receiving in field 142. The NPV received in field 148 is calculated based on the date of deposit received in field 144, the estimated date of return of deposit to lessor received in field 146, and the annual incremental borrowing rate received in field 62 of screen 60.

Figure 5C:
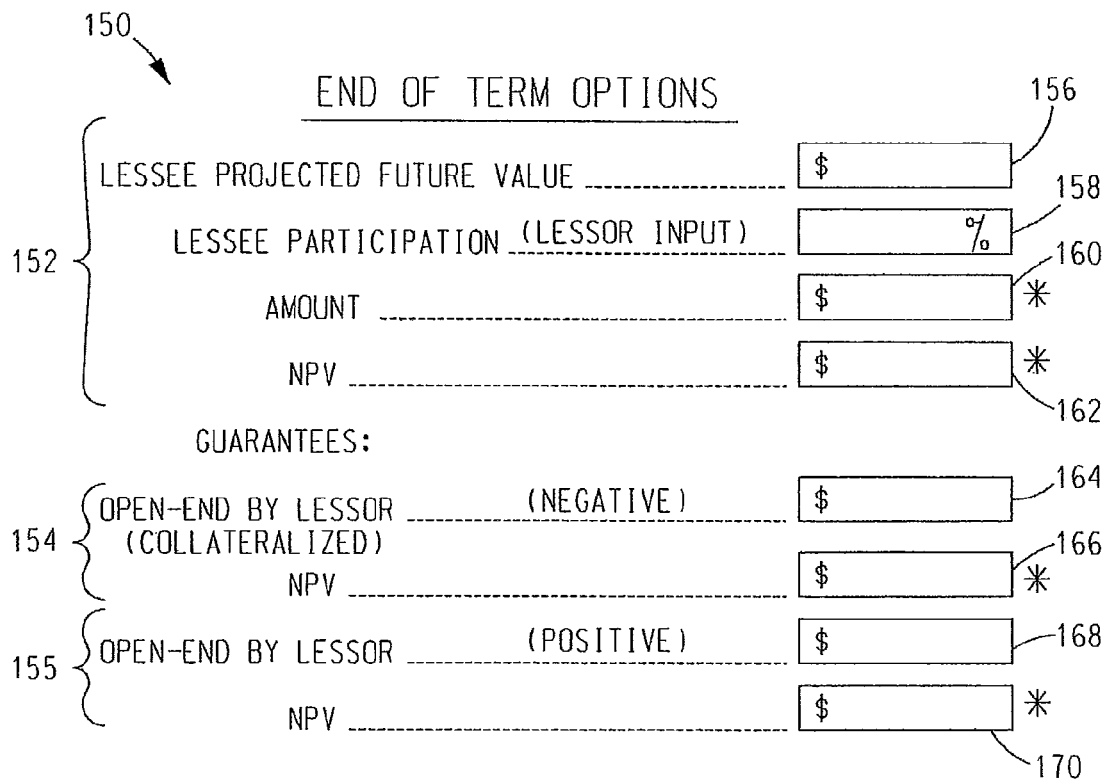

In FIG. 4, if one or more of the three fields in "Yes" column 114 associated with the end of term options of column 112 are selected, the software displays on the lessee's display terminal the corresponding parts of the end of term options screen 150 shown in FIG. 5C. End of term options screen 150 includes three parts, namely, a lessee projected future value part 152, a lessor open-end guarantees part 154, and a lessee closed-end guarantees part 155 that are displayed on the lessee's display terminal in response to selection of the corresponding field in "Yes" column 114 of the end of term options in column 112. The lessee projected future value part 152 includes a field 156 for receiving the lessee projected future value, a field 158 for the lessor's input of the percentage of the lessee's participation in the future value received in field 156, a field 160 for receiving a software calculated amount of the percentage of the lessee's participation received in field 158, and a field 162 for receiving a software calculated NPV of the amount received in field 160. The value received in field 160 is the product of the lessee's projected future value received in field 156 and the percentage of lessee participation received in field 158. The NPV received in field 162 is calculated based on the lease term received in field 124 of lease payments screen 120, the annual incremental borrowing rate received in field 62 of NPV ratio scoring screen 60, and the lease commencement date received in field 132 of lease payments screen 120.

The lessor open-end guarantees part 154 of end of term options screen 150 includes field 164 for receiving a value corresponding to an open-ended guarantee by lessor. Based on the value received in field 164, the lease term received in field 124, the annual incremental borrowing rate received in field 62, and the lease commencement date received in field 132, the software calculates anNPV for the value of the open-ended guarantee by lessor and inserts this NPV into a field 166. The lessee closed-end guarantees part 155 of end of term option screen 150 includes a field 168 for receiving a value corresponding to a closed-end guarantee by lessee, and a field 170 for receiving a software calculated NPV for the closed-end guarantee by lessee. The value inserted into field 170 is calculated in essentially the same manner as the value inserted into field 166, except that the value received in field 170 is substituted for the value received in field 164. The lessor open-end guarantee part 154 and the lessee closed-end guarantee part 155 are mutually exclusive. Hence, the software will only accept data in fields 164 and 166 of lessor open-end guarantee part 154, or fields 168 and 170 of lessee closed-end guarantee part 155.

Figure 5D:
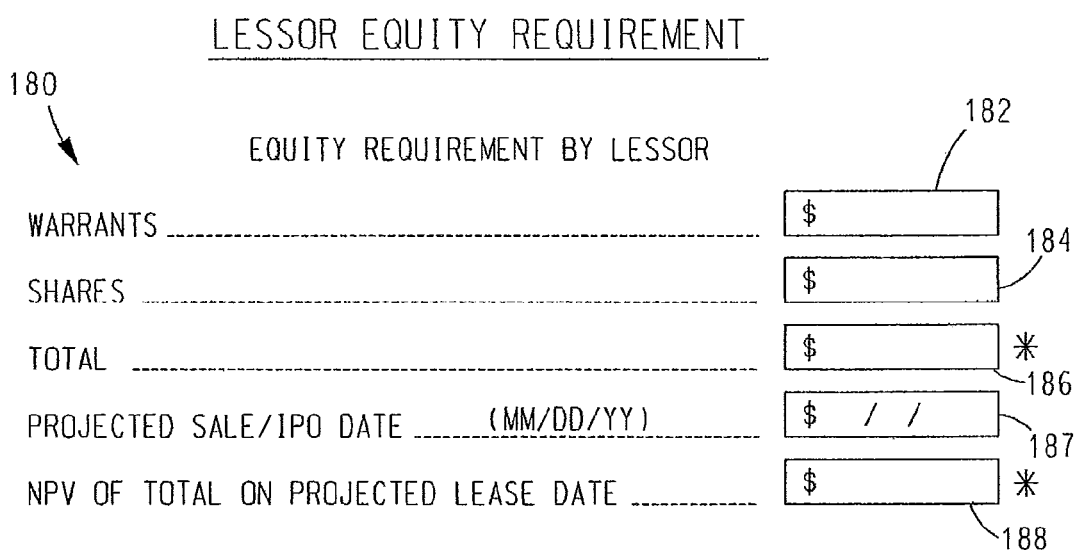

Referring back to FIG. 4, if the field in "Yes" column 114 associated with the lessor equity requirement of column 112 is selected, the software displays on the lessee's display terminal the lessor equity requirement screen 180 shown in FIG. 5D. The lessor equity requirement screen 180 includes fields 182 and 184 for receiving values of all of the warrants and shares required by the lessor of a prospective lessee. The software sums together the value of warrants and shares received in fields 182 and 184 and inserts the sum into field 186 as a value of the total equity required by the lessor. Lessor equity requirement screen 180 also includes a field 187 for receiving a projected sale/IPO date of the lessee. The sale/IPO date received in field 187 is retained as a reminder for a prospective lessor of a date when the lessee is selling his business or seeking investment therein. Based on the total received in field 186, the lease commencement date received in field 132 along with the lease term received in field 124 and the annual incremental borrowing rate received in field 62, the software calculates for the projected sale/IPO date an NPV of the total received in field 186 and inserts this value into field 188.

Figure 5E:
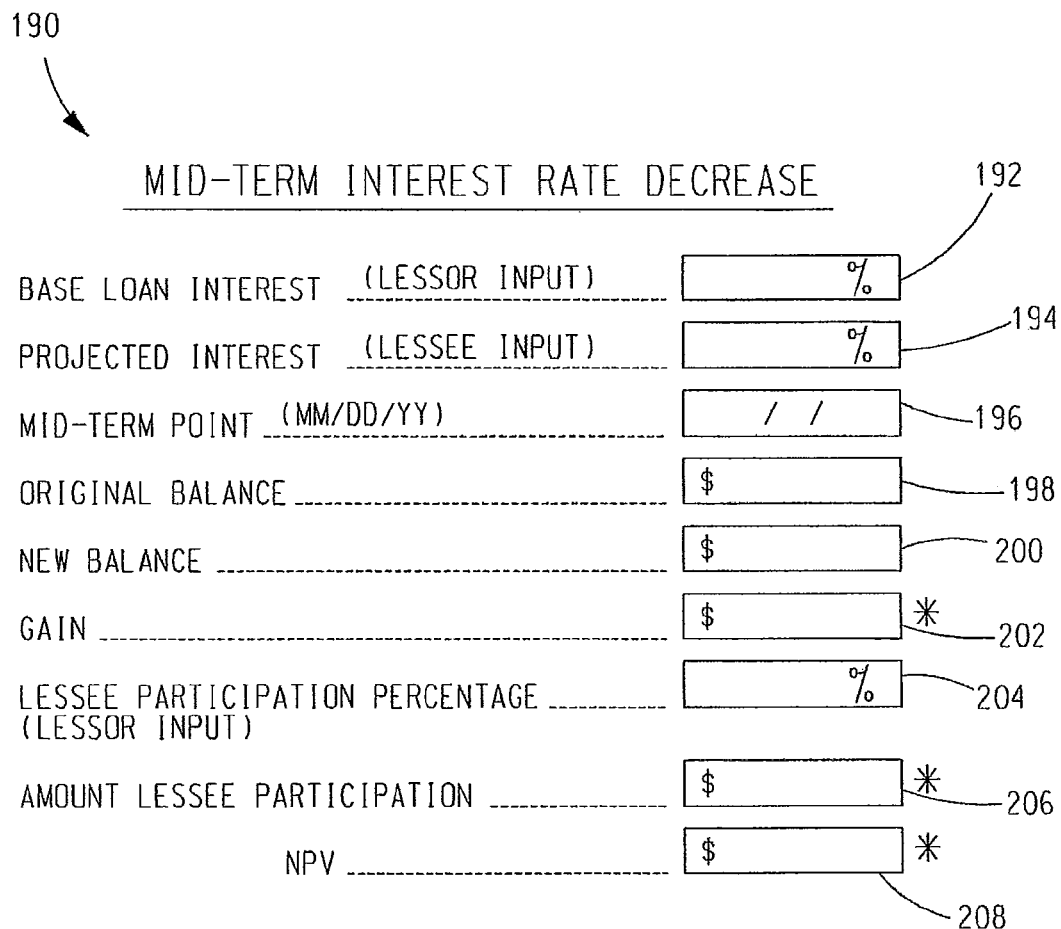

With reference back to FIG. 4, if the "Yes" field in column 114 associated with the mid-term interest rate decrease of column 112 is selected, the software displays on the lessee's display terminal a mid-term interest rate decrease screen 190 shown in FIG. 5E. The mid-term interest rate decrease screen 190 includes fields 192 and 194 for receiving the lessor's value of a base loan interest rate and a value of a lessee projected interest rate, respectively. A field 196 is provided for receiving data corresponding to the mid-term point or date, during the lease. Fields 198 and 200 are provided for receiving data corresponding to the original remaining balance of the lease and the new remaining balance of the lease, respectively, at the mid-term point. The software calculates the difference between the original balance of the lease received in field 198 and the new balance of the lease received in field 200 and inserts this value in a gain field 202. A field 204 is provided for receiving the lessor's estimate regarding the lessee's percentage of participation in the gain inserted in field 202. The software calculates the amount of lessee participation from the product of the gain inserted into field 202 and the data received in the lessee participation field 204 and inserts this amount in field 206. The software also determines the NPV of the amount of lessee participation based upon the data inserted in the amount of lessee participation field 206, the lease term received in field 124 and the annual incremental borrowing rate received in field 62 and inserts this value in NPV field 208.

In FIG. 4, if either of the fields in "Yes" column 114 associated with the miscellaneous additional payments of column 112 are selected, the software displays on the lessee's display terminal the corresponding part or parts 222 or 224 of the miscellaneous additional payments screen 220 shown in FIG. 5F. Miscellaneous additional payments screen 220 includes a first part 222 that is displayed in response to selection of the "Yes" field in column 114 associated with personal property tax in column 112. Miscellaneous additional payments screen 220 also has a second part 224 which the software displays in response to the selection of the "Yes" field in column 114 associated with maintenance in column 112.

First part 222 of miscellaneous additional payments screen 220 includes fields 225 and 227 for receiving data corresponding to the monthly amount of the personal property taxes for the lease to be paid by the lessor and the lessee, respectively, even if that value is zero. Similarly, second part 224 of miscellaneous additional payments screen 220 includes fields 229 and 231 for receiving data corresponding to the monthly amount of the maintenance related to the lease to be paid by the lessor and the lessee, respectively, even if that value is zero. NPV fields 226, 228, 230 and 232 are calculated and inserted by the software based on the data received in fields 225, 227, 229 and 231, respectively, and the annual incremental borrowing rate received in field 62.

Figure 5G:
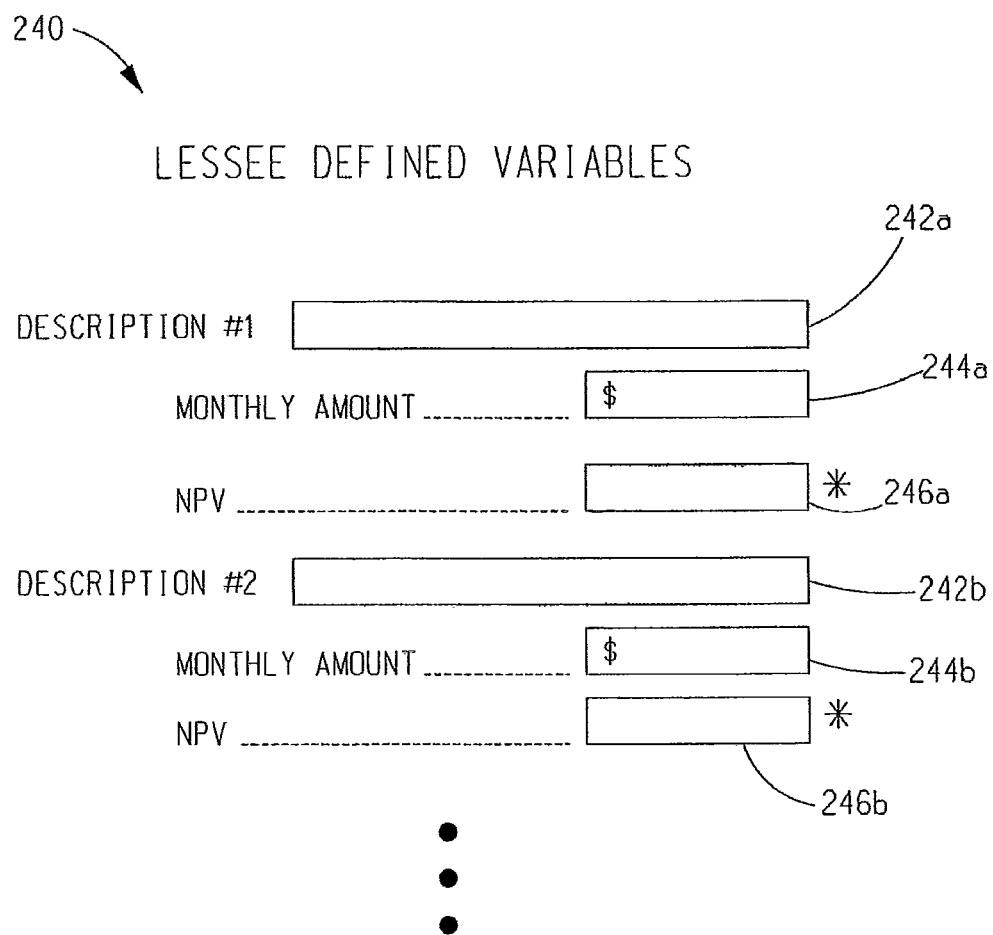

In FIG. 4, if the "Yes" field in column 114 associated with the lessee defined variables in column 112 is selected, the software displays the lessee defined variables screen 240 shown in FIG. 5G. Lessee defined variables screen 240 includes one or a plurality of fields 242*a*, 242*b*, etc., for receiving lessee data corresponding to a description of each lessee defined variable. Associated with each field 242*a*, 242*b*, etc., is a field 244*a*, 244*b*, etc., for receiving lease data regarding the monthly amount of the corresponding lessee defined variable in fields 242*a*, 244*a*, etc. NPV fields 246*a*, 246*b*, etc. are provided for receiving software calculated NPV's for the data received in fields 244*a*, 244*b*, etc, based on the annual incremental borrowing rate received in field 62.

The data entered by the lessee into one or more of the fields of the quantitative variable screens shown in FIGS. 5A-5G can be generated by the lessee based on his prior experience or can be acquired from one or more prospective lessors. Preferably, data acquired from prospective lessors and entered into one or more fields of the quantitative variable screens shown in FIGS. 5A-5G are acquired at a time so that the entered data reflects lease terms and conditions that are presently available.

Figure 6:
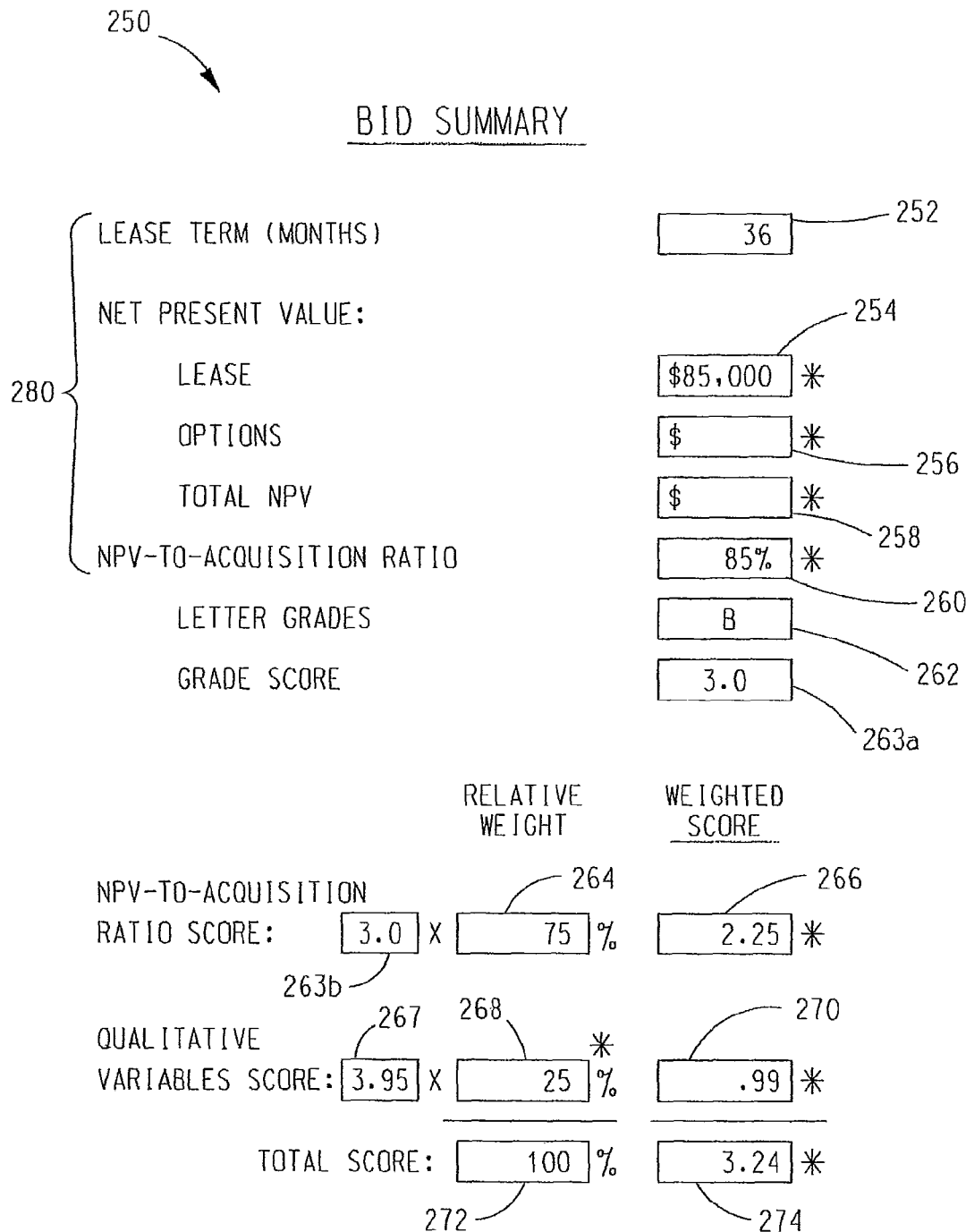
FIG. 6 is a schematic drawing of an on-line bid summary screen for displaying a summary of both the quantitative bid data entered in FIGS. 5A-5G and the lessee's qualitative data entered in FIG. 3.

With reference back to FIG. 1, when the lessee completes step 18, i.e., when the lessee completes entering data in the fields of one or more of the quantitative variable screens shown in FIGS. 5A-5G, the software advances to step 20 where the results of the simulation are calculated and displayed on a bid summary screen 250 shown in FIG. 6. Bid summary screen 250 includes field 252 for receiving the lease term that was entered in field 64 of NPV ratio scoring screen 60. Also provided are fields 254, 256 and 258. The software inserts into field 254 the lease NPV computed value received in field 122 of lease payments screen 120 shown in FIG. 5A. Field 256 is associated with the NPV of the options which is determined by summing the NPV of the cash performance deposit received in field 148 of FIG. 5B, the NPV of the lease projected future value received in field 162 of FIG. 5C, the NPV of the end of term guarantee inserted into fields 166 or 170 of FIG. 5C, the total NPV of the lessor's equity requirement received in field 188 of FIG. 5D, the NPV of the mid term interest rate decrease amount received in field 208 of FIG. 5E, the NPV of the personal property taxes and/or maintenance values received in fields 226, 228, 230 and/or 232 of FIG. 5F, and the NPV of the lessee defined variables received in fields 246*a*, 246*b*, etc. of FIG. 5G. The software calculates the total NPV by summing the values received in fields 254 and 256 and inserts this total NPV into field 258.

Bid summary screen 250 includes a field 260 for receiving a software calculated ratio of the total NPV received in field 258 of FIG. 6 divided by the acquisition costs received in field 70 of NPV ratio scoring screen 60. Based on the calculated ratio inserted in the NPV acquisition ratio field 260, the software inserts into field 262 a grade therefor based on the grade-to-range of percentages entered into matrix 74 of NPV ratio scoring screen 60, and the corresponding grade score into fields 263*a*, 263*b* based upon the grade-to-weighting value shown in scale 84 of FIG. 2.

Bid summary screen 250 includes field 264 in which the lessee enters a relative weight for the NPV-to-acquisition ratio score. For example, if field 262 receives a grade of "B", the software inserts a weighting value of 3.0 in field 263*b* and multiplies this value by the relative weight received in field 264 to obtain a weighted NPV-to-acquisition ratio score which the software inserts into field 266.

Next, the software calculates a difference between the relative weight received in field 264 and the total score value, i.e., 100%, automatically inserted into the total score field 272, and inserts this difference in field 268 as the relative weight of the qualitative variable score. This value is multiplied by the total weighted score inserted by the software into field 267 from field 104 of qualitative lessor variables screen 90 of FIG. 3 to obtain a weighted qualitative variables score which is inserted by the software into field 270. For example, if the relative weight of the qualitative variable score received in field 268 is 25%, the value 0.25 is multiplied by the total weighted score of, for example, 3.95, inserted into field 267 to obtain the product, i.e., 0.99, which is then inserted into field 270.

The software sums values received in fields 266 and 270 and inserts this sum into field 274. The sum received in field 274 represents a weighted total score that is based on the quantitative and qualitative data received or inserted into the fields of the preceding screens. The value received in field 272 is simply the sum of the relative weights received in fields 264 and 268, and must equal 100%.

By using data derived from additional variable ratio scoring screens, such as internal rate of return, trade-in amounts, soft costs, etc. (not shown), additional scoring categories can be included in bid summary screen 250 to develop the weighted total score received in field 274.

Referring back to FIG. 1, after completing step 20, the software advances to step 22 where the lessee is given the option of running additional simulations. To this end, the lessee can modify the data received in the various fields of FIGS. 2-5G, and have the software insert and/or calculate new values in the various software calculated fields in order to generate additional simulations based upon different quantitative and/or qualitative data.

Provisions can be included in the software for recording and displaying one or more simulations and, particularly, bid summary screen 250 in one or more manners that facilitate individual or side-by-side comparison of the one or more simulations.

With ongoing reference to FIG. 1, if the lessee decides to not run additional simulations, the software advances to step 24, wherein the lessee can choose to conduct the auction. If the lessee chooses to not conduct the auction, the software advances to step 26, wherein the simulation is terminated. However, if the lessee decides to conduct the auction, the software advances to the auction part 6 of flow chart 2 and presents to the lessee a screen (not shown) which enables the lessee to select a preferred lease simulation having quantitative data and qualitative data that best fits the lessee's lease requirements. Other screens (not shown) can also be provided that enable the lessee to select the time the auction commences and the time the auction terminates.

In step 28, at a time the auction is in progress, one or more prospective lessors enter the auction. In connection with entry into the auction, each prospective lessor registers their name and preassigned lessor number on the web site and commits in certain screens (not shown) thereon to perform the lease according to the prospective lessor's bid if it is accepted by the lessee. Once registered, the software advances to step 30 where the lessor is given access to the quantitative and qualitative data included in the various fields of FIGS. 2-5G for the lessee's selected simulation. As a condition precedent to the lessee conducting the auction, the lessee also registers on the web site and makes a commitment to perform a bid that matches the lessee's selected simulation or pay a transaction fee to the web site host.

After the prospective lessor reviews and considers the quantitative and qualitative data from the lessee selected simulation, the software advances to step 32 where the prospective lessor can choose to continue the auction. If the prospective lessor chooses to terminate his involvement in the auction, the software advances to step 34 and the prospective lessor exits the auction. If, however, the prospective lessor elects to continue the auction, the software advances to step 36. In step 36, the prospective lessor enters bid data on the quantitative variable screens shown in FIGS. 5A, 5B, 5C, 5D, 5E and/or 5F. To ensure correspondence between the quantitative variables screens selected by the lessee and the quantitative variable screens accessible to the lessor, the lessee's selection of the "Yes" fields in column 114 or the "No" fields in column 116 of deal NPV screen 110 determines which quantitative variable screens are displayed on the lessor's display terminal during the auction. More specifically, the selection of a field in "Yes" column 114 will result in the corresponding display screen, or part thereof, being displayed on the lessor's display terminal. In contrast, the selection of a field in "No" column 116 will result in the corresponding screen, or part thereof, not being displayed on the lessor's display terminal.

After receiving the prospective lessor's bid data on the quantitative variable screens shown in FIGS. 5A, 5B, 5C, 5D, 5E and/or 5F, the software advances to step 38 where the prospective lessor's bid data is processed and the results displayed in fields 252, 254, 256, 258 and 260 of part 280 of bid summary screen 250. The results displayed in part 280 enables the prospective lessor to compare his quantitative and qualitative bid data with the quantitative and qualitative bid data from the lessee's selected simulation. Next, the software advances to step 40 where the prospective lessor can choose to revise or submit his bid data. If the prospective lessor decides to revise his bid data, the software returns to step 36 and the prospective lessor enters new bid data or amends previously entered bid data. If, however, the prospective lessor decides to submit his bid data, the software advances to step 42 where the bid data is submitted to the lessee for consideration.

In step 42, the software displays the submitted bid data on the lessee's display terminal for consideration by the lessee. The submitted bid data can include the quantitative data input by the prospective lessor along with qualitative data, such as the prospective lessor's loan documents, which can be attached to the quantitative data in the same manner as a data file is attached to a conventional e-mail. In response to reviewing the submitted bid data, the lessee can assign a grade to each of the prospective lessor's qualitative variables that form part of the bid data utilizing a screen like the qualitative lessor variables screen 90 shown in FIG. 3. The qualitative variables description in column 94 and the corresponding relative weight in column 98 of qualitative lessor variables screen 90 displayed to the lessee during an auction are preferably the same as those displayed during the lessee's selected simulation forming the basis for the auction. Based on the qualitative variables received from the lessor as part of the submitted bid data, the lessee assigns to each qualitative variable a grade which, when multiplied by the relative weight in column 98, generates therefor a weighted score in column 100 for each listed qualitative variable in column 94. In addition, if desired, another screen (not shown) can be provided for enabling the lessee to modify for each prospective lessor the relative weights included in fields 264 and 268 of bid summary screen 250 in order to account for additional qualitative information known to the lessee.

Figure 7:
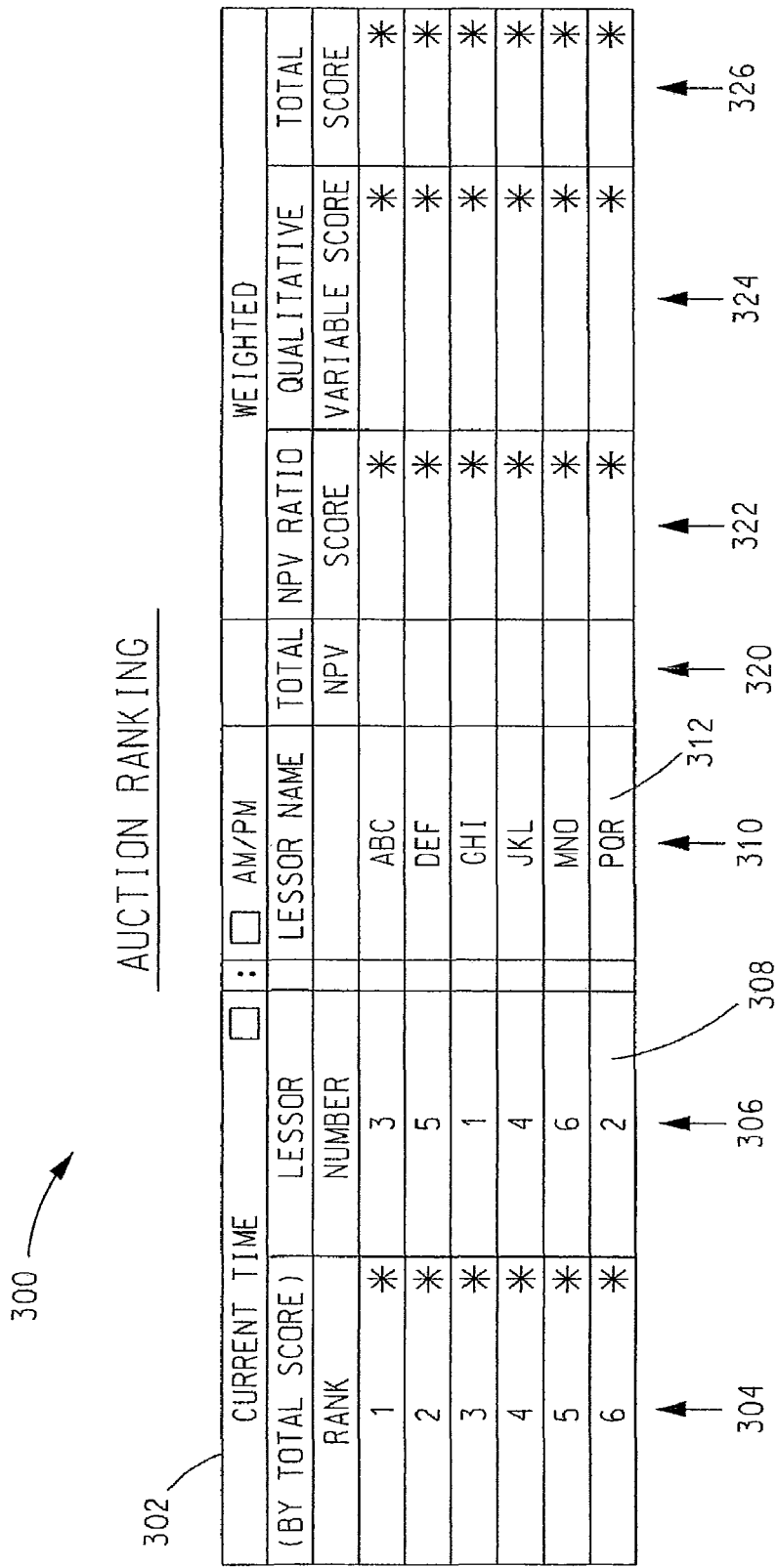
FIG. 7 is a schematic drawing of an on-line auction ranking screen for displaying the relative rank of each prospective lessor participating in an auction.

Next, the software advances to step 44 where the qualitative and quantitative variables are processed and the results of the bid are output on an auction ranking screen 300 shown in FIG. 7.

A comparative summary of each lessor's bid displayed on the bid summary screen 250 of each lessor is displayed on auction ranking screen 300 which includes a field 302 for receiving the current time, a column 304 having a series of lessor ranks (by total score), a column 306 having a plurality of fields 308 for receiving lessor numbers corresponding to the lessors participating in the auction, and a column 310 having fields 312 for receiving a lessor name corresponding to each lessor number. Lessor names are displayed only on the lessee's version of this screen. Auction ranking screen 300 also includes a column 320 where the software inserts the total NPV received in the total NPV field 258 of the bid summary screen 250. Also provided are a weighted NPV ratio score column 322, a weighted quantitative variable score 324, and a weighted total score column 326.

From the qualitative variables received from the lessee in response to the submitted bid data received from the prospective lessor, the software enters into the appropriate row of columns 322 and 324 the corresponding weighted NPV-to-acquisition ratio score and weighted qualitative variable score calculated in the manner described above for fields 266 and 270 of bid summary screen 250. Auction ranking screen 300 can also include columns (not shown) for receiving, for each prospective lessor, weighted scores of internal rate of return, trade-in amounts, soft costs, etc., that may have been included in the additional variable ratio scoring screens discussed above but not specifically shown herein.

Next, the software sums the weighted NPV-to-acquisition ratio score and the weighted qualitative variable score for each prospective lessor and inserts this sum into the corresponding weighted total score field in column 326.

Figure 8:
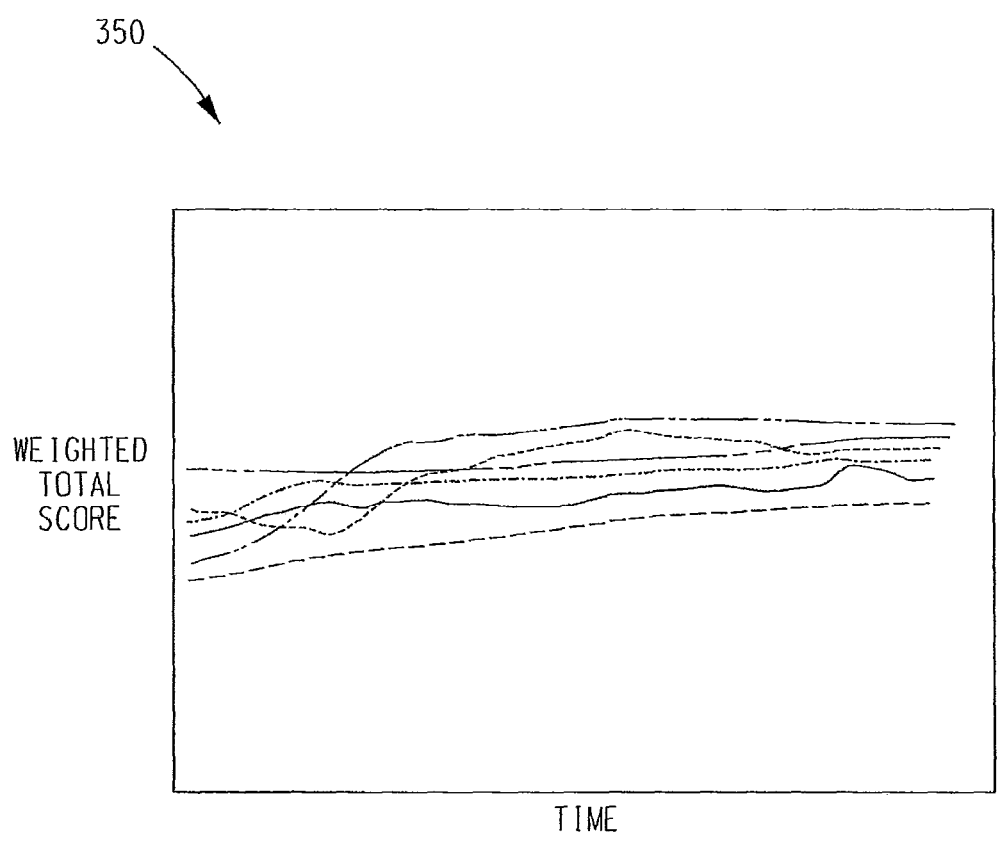
FIG. 8 is a schematic drawing of an on-line graph of weighted total score for each different lessor vs. time.

With reference back to FIG. 1, after step 44, the software advances to step 46 where the software graphs each prospective lessor's weighted total score (from FIG. 7) vs. time and displays the output on a weighted total score vs. time graph 350 shown in FIG. 8. To enable each prospective lessor to assess his bid in light of his quantitative variables and the lessee's assigned qualitative variables, the auction ranking screen 300 and the weighted total score vs. time graph 350 are displayed on each prospective lessor's and the lessee's respective display terminals via the Internet. More specifically, a new auction ranking screen 300 and weighted total score vs. time graph 350 are displayed on-line to each prospective lessor and the lessee each time a new weighted total score is inserted by the software in one of the weighted total score fields of column 326.

Next, the software advances to step 50 where the software determines if the auction is complete. If the auction is complete, the software branches to step 54 and the auction is terminated. However, if the auction is still in progress, the software advances to step 52. In step 52, the prospective lessor chooses whether to submit a revised bid. If so, the software branches to step 36. When entering step 36 from step 52, the software displays on the prospective lessor's display terminal the quantitative variables screens shown in FIGS. 5A, 5B, 5C, 5D, 5E and/or 5F including the previously entered bid data for revision by the prospective lessor. Thereafter, the software repeats steps 38-52.

In step 52, if the prospective lessor chooses to not submit revised bid data, the software branches back to step 48 where the software waits to update the lessor's and lessee's respective auction ranking screens 300 and weighted total score vs. time graphs 350 when a new weighted total score is inserted by the software in one of the total weighted score fields of column 326 of the auction ranking screen 300.

Steps 48-52 are repeated until the auction is complete, at which time the software branches to step 54 and the auction is terminated. Thereafter, the lessee can accept the lease from the lessor having the greatest weighted total score or can choose to reject all bids and conduct the auction at a later date.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

I claim:

1. A lease auction method comprising the steps of:
   (a) providing to at least one lessor's computer via a computer network a first plurality of lessee entered qualitative lessor variables and a first plurality of lessee entered quantitative lessor data regarding a lease input at a lessee's computer;
   (b) receiving from each lessor's computer via the computer network a second plurality of lessor entered qualitative lessor variables and a second plurality of lessor entered quantitative lessor data regarding the lease;
   (c) receiving from the lessee's computer via the computer network for at least one of the lessor entered qualitative lessor variables for each lessor at least one of a grade and a relative weight related to an importance of the at least one lessor entered qualitative lessor variable to the lessee;
   (d) for each lessor, processing the at least one of the grade and the relative weight received for the at least one lessor entered qualitative lessor variable and the lessor entered quantitative lessor data to determine a weighted total score;
   (e) ranking the weighted total scores;
   (f) displaying the ranked weighted total scores on the lessee's computer and each lessor's computer via the computer network; and
   (g) repeating steps (c) through (f) each time a change of at least one of the lessor entered qualitative lessor variables or at least one of the lessor entered quantitative lessor data is received from at least one of the lessor's computers via the computer network, wherein the lessor entered qualitative lessor variables and the lessee entered qualitative lessor variables each include at least one of the following: lessor's lease documents; lessor's reputation; lessor's knowledge of the item being leased; lessor's status as a private or public entity; and whether the lessor is also a vendor.

2. The lease auction method as set forth in claim 1, further including the steps of:
   receiving from the lessee's computer via the computer network a third plurality of lessee entered qualitative lessor variables and a third plurality of lessee entered quantitative lessor data;
   processing the third plurality of lessee entered qualitative lessor variables and the third plurality of lessee entered quantitative lessor data to obtain a first lease simulation outcome;
   displaying the first lease simulation outcome on the lessee's computer via the computer network;
   receiving from the lessee's computer via the computer network at least one of a fourth plurality of lessee entered qualitative lessor variables and a fourth plurality of lessee entered quantitative lessor data;
   processing the at least one of the fourth plurality of lessee entered qualitative lessor variables and the fourth plurality of lessee entered quantitative lessor data to obtain a second lease simulation outcome;
   displaying the second lease simulation outcome on the lessee's computer via the computer network; and
   providing to the at least one lessor's computer in step (a), as the first plurality of lessee entered qualitative lessor variables and the first plurality of lessee entered quantitative lessor data, the third or fourth plurality of lessee entered qualitative lessor variables and the corresponding third or fourth plurality of lessee entered quantitative lessor data, respectively, based on the first or second lease simulation outcome provided to the lessee's computer via the computer network.

3. The lease auction method as set forth in claim 2, further including the steps of:

commencing the auction after completing one or more lease simulations; and terminating the auction at one of (i) a predetermined time and (ii) after expiration of a predetermined interval.

4. The lease auction method as set forth in claim 1, wherein the lessor entered quantitative lessor data and the lessee entered quantitative lessor data each include at least one of the following:

borrowing rate;
term of lease;
estimated lease payments;
total net present value (NPV);
acquisition cost; and
ratio of total NPV divided by acquisition cost.

* * * * *